United States Patent
Hau et al.

(10) Patent No.: US 12,206,356 B2
(45) Date of Patent: Jan. 21, 2025

(54) INTEGRATED SOLAR CARPORT

(71) Applicant: GM Cruise Holdings LLC, San Francisco, CA (US)

(72) Inventors: Darren Hau, Menlo Park, CA (US); Jeffrey Robert Brandon, Phoenix, AZ (US); Lin Zhuang Khoo, Oakland, CA (US)

(73) Assignee: GM Cruise Holding LLC, San Francisco, CA (US)

( * ) Notice: Subject to any disclaimer, the term of this patent is extended or adjusted under 35 U.S.C. 154(b) by 220 days.

(21) Appl. No.: 17/967,738

(22) Filed: Oct. 17, 2022

(65) Prior Publication Data

US 2024/0128921 A1 Apr. 18, 2024

(51) Int. Cl.
*H02S 20/24* (2014.01)
*H02S 40/36* (2014.01)

(52) U.S. Cl.
CPC ............. *H02S 20/24* (2014.12); *H02S 40/36* (2014.12)

(58) Field of Classification Search
CPC .......... H02S 20/24; H02S 40/36; H02S 20/10; B60L 53/51; E04H 6/025; F24S 25/12
See application file for complete search history.

(56) References Cited

U.S. PATENT DOCUMENTS

| | | | |
|---|---|---|---|
| 8,402,704 B2* | 3/2013 | Hartley | F24S 25/13 52/173.3 |
| 11,152,791 B2 | 10/2021 | Qin et al. | |
| 11,370,314 B1* | 6/2022 | Keister | B60L 53/22 |
| 2011/0030285 A1* | 2/2011 | Kaufman | E04H 6/025 52/173.3 |
| 2013/0113413 A1* | 5/2013 | Harty | H01M 10/465 320/109 |
| 2017/0366039 A1 | 12/2017 | Qin et al. | |
| 2019/0169871 A1* | 6/2019 | McKibben | H02S 20/23 |
| 2021/0288607 A1* | 9/2021 | Moslehi | H01L 31/0481 |
| 2022/0077513 A1* | 3/2022 | Thramann | B60L 53/51 |
| 2023/0339338 A1* | 10/2023 | Horvath | H02J 7/0042 |
| 2023/0356607 A1* | 11/2023 | McAlwee | B60L 53/57 |
| 2023/0411967 A1* | 12/2023 | Finn | B60L 53/63 |

* cited by examiner

*Primary Examiner* — Gisele D Ford (57) ABSTRACT

The disclosed technology provides solutions for improving solar carport systems and in particular, for improving a solar carport integrated with a busbar. Aspects of the disclosed technology include an integrated solar carport that includes at least one beam, at least one rail coupled to the at least one beam, and one or more vertical columns configured to support the at least one beam and the at least one rail. Further, the integrated solar carport includes one or more solar modules coupled to the at least one beam or the at least one rail and a busbar coupled to each beam of the at least one beam and one of the vertical columns. Methods of manufacturing the integrated solar carport are also provided.

13 Claims, 5 Drawing Sheets

INTEGRATED SOLAR CARPORT

BACKGROUND

1. Technical Field

The present disclosure generally relates to a solar carport and, more specifically, a solar carport integrated with a busbar.

2. Introduction

A carport is a covered structure designed to provide limited protection to vehicles that are parked underneath. A roof or cover of the carport protects vehicles from snow, rain, or hail and further provides shade from sunlight exposure. In particular, a solar carport is an overhead shade structure that includes a plurality of solar panels to form the roof of the shade structure. A solar can serve the dual purposes of protecting vehicles as a shade structure and providing renewable energy resources by capturing solar energy placed over a parking area.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

In today's energy market, producing electricity in a renewable way is essential. Renewable energy provides reliable power supplies and fuel diversification, which reduces greenhouse gas emissions from fossil fuels and further reduces some types of air pollution. The high demand for renewable energy can be addressed by collecting or harvesting energy from renewable sources such as sunlight.

A solar carport can be implemented in parking areas to protect vehicles and simultaneously generate solar power via solar panels throughout the day. The covered structure of a solar carport can reduce radiant heat on vehicles that are parked underneath. Furthermore, when electric vehicles (EVs) are parked and getting charged from an EV charger, which may be placed at or near the solar carport, the covered structure of a solar carport can provide protection from overheating the vehicles and the EV charger, which can cause the throttling of charging speeds. However, it is expensive and laborious to install, operate, and maintain individual EV chargers, solar modules, and energy storage systems separately. Such a separate system can result in a higher balance of system costs such as redundant AC/DC conversion and fuses.

Therefore, there exists a need for an integrated structure that can provide protection (e.g., shade) and renewable energy generation. Also, there exists a need for an integrated solar carport system that can reduce the number of power conversion steps, which then further reduces the marginal cost of installing each system component and operating costs. The present technology includes systems and methods for solving these problems and discrepancies, among others. Described herein are systems, apparatuses, processes (also referred to as methods), and computer-readable media (collectively referred to as "systems and techniques") for incorporating solar panels and an EV charger into a single carport structure and sharing a common DC busbar (e.g., a single integrated carport system). More specifically, the systems and techniques described herein can provide a single carport structure, in which a busbar is integrated as a structural element and configured to route power to an EV charger that can provide power to electric vehicles (EVs) and/or autonomous vehicles (AVs).

The present technology can provide a covered structure that can be adapted for a wide variety of purposes such as energy distribution, energy storage, and energy delivery, in addition to providing protection from snow, rain, and hail, and shade from sunlight exposure. Further, the present technology can generate solar power, store electric energy for low-cost power, and charge autonomous vehicles (AVs) and electric vehicles (EVs) including electric cars, electric bikes, electric motorcycles, electric scooters, etc.

In some examples, the integrated solar carport of the present disclosure can incorporate one or more busbars integrated into the solar carport structure. The integrated busbar(s) can distribute high-voltage DC power to/from various distributed energy resources such as solar modules, EV chargers, stationary energy storage, or any applicable energy resources. This way, the integrated busbar(s) can be directly connected to all power electronics at a fixed voltage without requiring an AC-to-DC rectification.

In some aspects, the integrated solar carport of the present disclosure can comprise solar modules with module-level power electronics so that the output can be directly routed to busbar(s) via an integrated MC4 connector or any applicable connector.

In some cases, the integrated solar carport of the present disclosure can comprise a string of solar modules (e.g., solar panels), which can be connected to a string-level power optimizer that converts the voltage of the string of solar modules to a common high voltage direct current (HVDC) bus voltage (e.g., 1,000V).

In some aspects, additional busbars can be easily added on together as needed or depending on the size of the integrated solar carport. More specifically, the integrated solar carport can be coupled to another integrated solar carport by simply extending another metal plate onto the existing metal plate. The modular design of the integrated solar carport can provide the advantages of convenient construction and assembly (e.g., reducing the cost of building an individual carport for a specific size and design).

Figure 1:
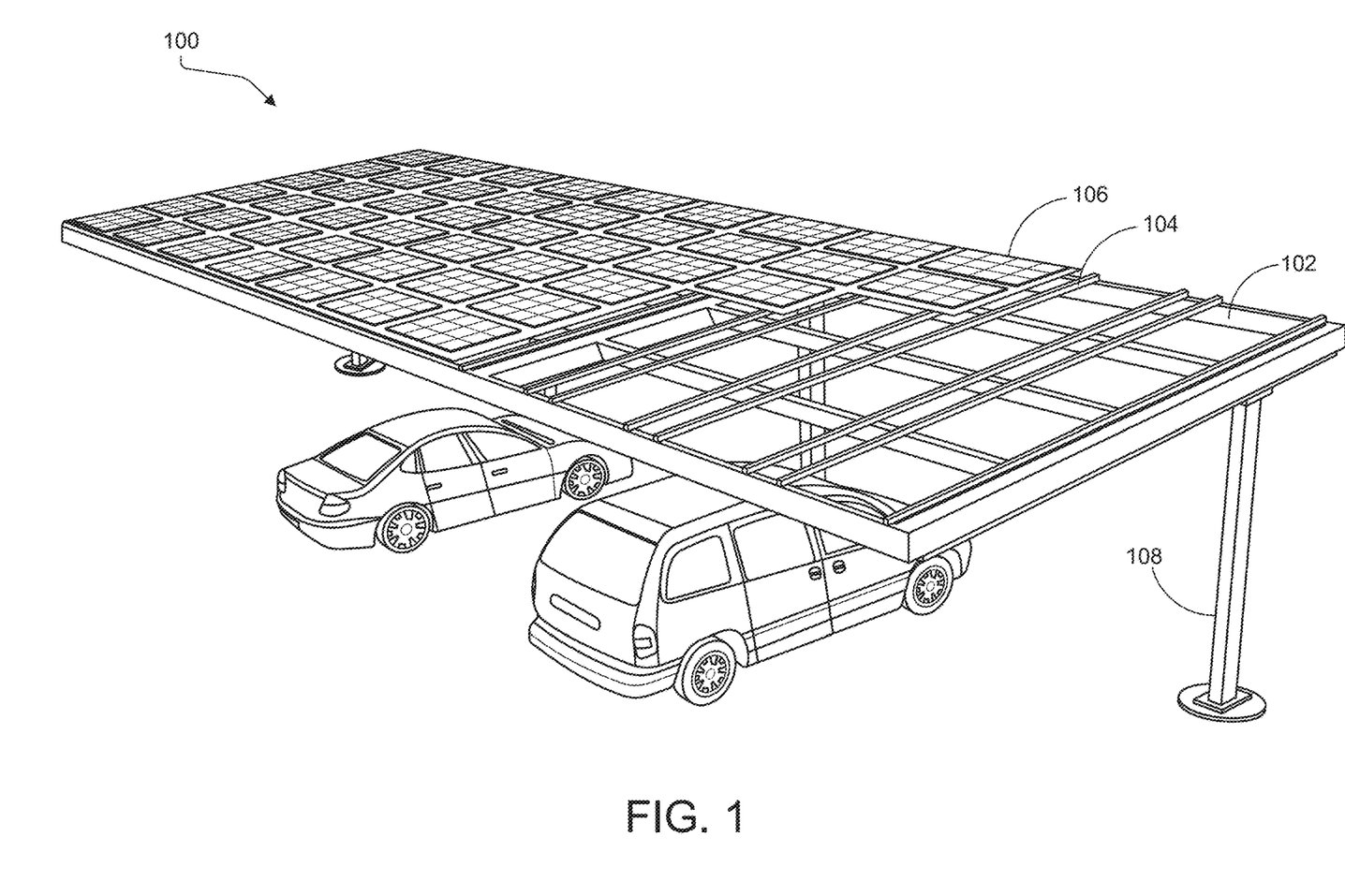
FIG. 1 illustrates an example of an integrated solar carport, according to some examples of the present disclosure.

FIG. 1 illustrates an example of an integrated solar carport 100. In the example of FIG. 1, integrated solar carport 100 comprises a beam (i.e., rib) 102 and a rail (i.e., spine) 104, which is coupled to beam 102 perpendicular to beam 102. Integrated solar carport 100 includes vertical columns (i.e., poles or vertical support) 108 that support beam 102 and rail 104. Further, integrated solar carport 100 comprises one or more solar modules 106 (i.e., solar panels, photovoltaic panels) that are coupled to beam 102 and rail 104. The number of beams 102, rails 104, solar modules 106 and vertical columns 108 that comprise integrated solar carport 100 can vary depending on the size of the structure. As shown in FIG. 1, beam 102, rail 104, and solar modules 106 form a roof/cover that provides shade for the vehicles that are parked underneath.

Figure 2:
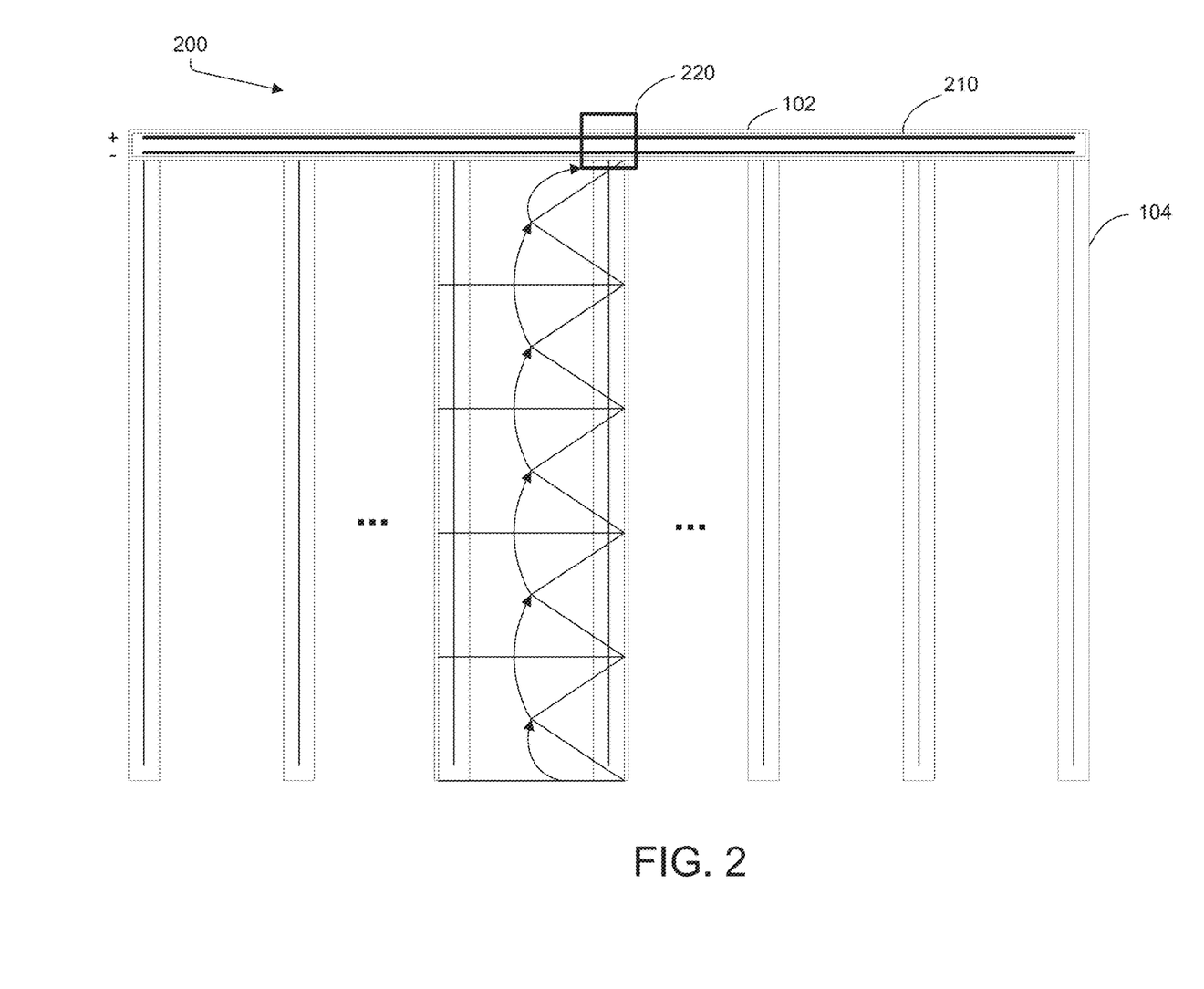
FIG. 2 illustrates a top view of an example integrated solar carport, according to some examples of the present disclosure.

In some examples, integrated solar carport 100 comprises a busbar (not shown), which is coupled to each beam 102 in a way that the busbar is integrated into the carport structure frame. FIG. 2 further illustrates a top view of integrated solar carport 100 with a detailed description of the busbar integrated into integrated solar carport 100.

Figure 3:
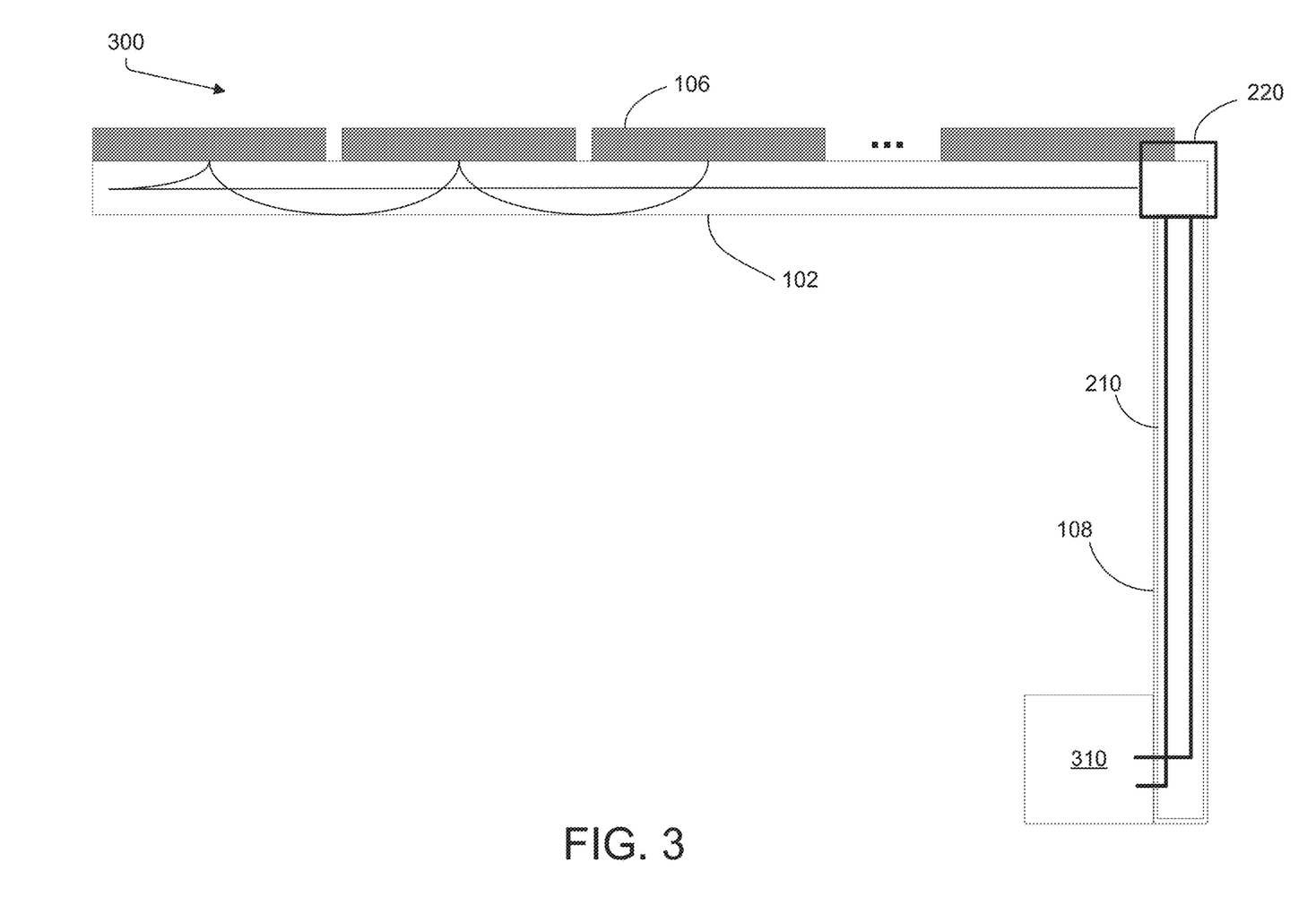
FIG. 3 illustrates a side view of an example integrated solar carport, according to some examples of the present disclosure.

FIG. 2 illustrates a top view 200 of an example integrated solar carport (e.g., integrated solar carport 100 as illustrated in FIG. 1). In the illustrated example of FIG. 2, integrated solar carport 100 includes a busbar 210. Busbar 210 can include two busbars, for example, one for a positive point and another for a negative point. In some aspects, busbar 210 is configured to route power to a DC/DC converter (i.e., DC-to-DC converter) 220, which is partially coupled to one of beams 102. More specifically, busbar 210 can distribute high voltage DC power to and/or from various distributed energy resources (DERs) at a site such as solar modules 106 as illustrated in FIG. 1, electrical vehicle (EV) chargers (e.g., EV charger 310 as illustrated in FIG. 3), stationary energy storage, or any applicable energy resources. As all power electronics can be directly connected to a single busbar 210 at a fixed voltage, integrated solar carport 100 removes the need for AC-to-DC rectification. For example, DC/DC converter 220 can take the voltage from busbar 210, without any other power conversion, and modulate it down to an EV battery pack voltage (e.g., at EV charger 310 as illustrated in FIG. 3).

In some aspects, busbar 210 can be designed to be modular. More specifically, a new busbar can be easily added on together as needed or depending on the size of integrated solar carport 110, for example by extending another metal plate onto the existing metal plate. As follows, the modular design can allow the integrated solar carport to be easily built and assembled for any desired space.

Further, in some examples, electrical connector(s) can be coupled to beam 102 and configured to electrically connect with busbar 210. An example of an electrical connector can include an MC4 connector. For example, MC4 connectors can be attached to beam 102 via an injection molding process. As follows, solar modules 106 with DC/DC converter 220 can have output put directly onto busbar 210 via an integrated electrical connector such as an MC4 connector.

In some cases, busbar 210 can be enclosed within the frame of integrated solar carport 100. For example, busbar 210 can be integrated into beam 102 or vertical column 108 via an aluminum extrusion process. Instead of having various cables or wires laid outside, a single busbar 210 can be simply deployed through each beam 102. As part of a structural element, busbar 210 can support the weight of integrated solar carport 100 (e.g., beam 102, solar modules 106, etc.).

In some examples, busbar 210 is insulated. For example, busbar 210 can have an insulating coating (e.g., rubberized coating) around it to provide high resistance. As follows, the insulating coating of busbar 210 can help resist heat or low temperature. Further, a thermal insulation coating on busbar 210 can make busbar 210 strongly anti-corrosive.

In some aspects, busbar 210 is a high voltage direct current (HVDC) busbar, which is configured to carry DC power. The HVDC busbar 210 can use DC for electric power transmission between any power electronics of integrated solar carport 100.

In some examples, busbar 210 is an Alternating Current (AC) busbar, which is configured to carry AC power. If solar module 106 contains a microinverter, AC power can be directly provided onto two AC busbars placed in beam 102. An EV charger or power storage system (e.g., battery) needs to convert between DC and AC power.

Furthermore, DC/DC converter 220 (e.g., DC/DC buck/boost converter) is configured to convert the voltage of solar modules 106 to the voltage of busbar 210 by serving the function of a string level power optimizer. For example, once busbar 210 routes power from solar modules 106 to DC/DC converter 220, DC/DC converter 220 can convert the voltage of solar modules 106 to the voltage of busbar 210.

In some cases, DC/DC converter 220 is removable. An example configuration can include an insert design where DC/DC converter 220 can be slotted into integrated solar carport 100 like a blade. In another example, DC/DC converter 220 can be connected to integrated solar carport 100 with a blade connector. Also, in another example, DC/DC converter 220 can be connected with an MC4 connector that can be secured in between a nut/bolt and torqued to spec.

In some aspects, busbar 210 and DC/DC converter 220 are connected via a current-limiting device for safety. For example, the connection between busbar 210 and DC/DC converter 220 can be made with a fuse to ensure that a safe amount of current flows in a circuit. Other examples of a current-limiting device for connection between busbar 210 and DC/DC converter 220 can include, without limitations, resistors, circuit breakers, transistors, and/or diodes.

In some examples, solar modules 106 are wired to each other in series in a way that a group of solar modules 106 (i.e., solar panels) in a string is wired into a single input. More specifically, each solar module 106 is connected to each other in a string (i.e., a panel string), connecting up to the voltage and then connected to its own independent busbar, which is then fed through DC/DC converter 220 to the common busbar.

In some cases, each solar module 106 can be coupled to a positive point of busbar 210 at rail 104 and a negative point of busbar 210 at beam 102 or vice versa (e.g., a negative point of busbar 210 at beam 102 and a negative point of busbar 210 at rail 104).

FIG. 3 illustrates a side view 300 of an example integrated solar carport (e.g., integrated solar carport 100 as illustrated in FIG. 1). In the illustrative example of FIG. 3, integrated solar carport 100 includes an EV charger 310, which is coupled to vertical column 108. In some examples, busbar 210 is affixed to beam 102 and routed down to vertical column 108. As follows, EV charger 310 can pull DC power directly from busbar 210. The direct connection between busbar 210 and EV charger 310 eliminates the need for an AC/DC rectification and therefore, reduces the overall cost of EV charger 310 and avoids any potential energy loss that may be caused by the power conversion.

In some examples, EV charger 310 can be mounted at the base of integrated solar carport 100 as shown in FIG. 3. In some aspects, EV charger 310 can be integrated into one of vertical column(s) 108 as a structural element. In other examples, EV charger 310 can be placed anywhere along vertical column 108 depending on the level and size of power. For example, for some fleet applications, EV charger 310 can be mounted higher up on vertical column 108 (e.g., closer to the roof/cover of integrated solar carport 100 or at a height that is generally near or above a roof of vehicles) so that an EV connector can be dropped down to vehicle(s) for easier cable management.

Figure 4:
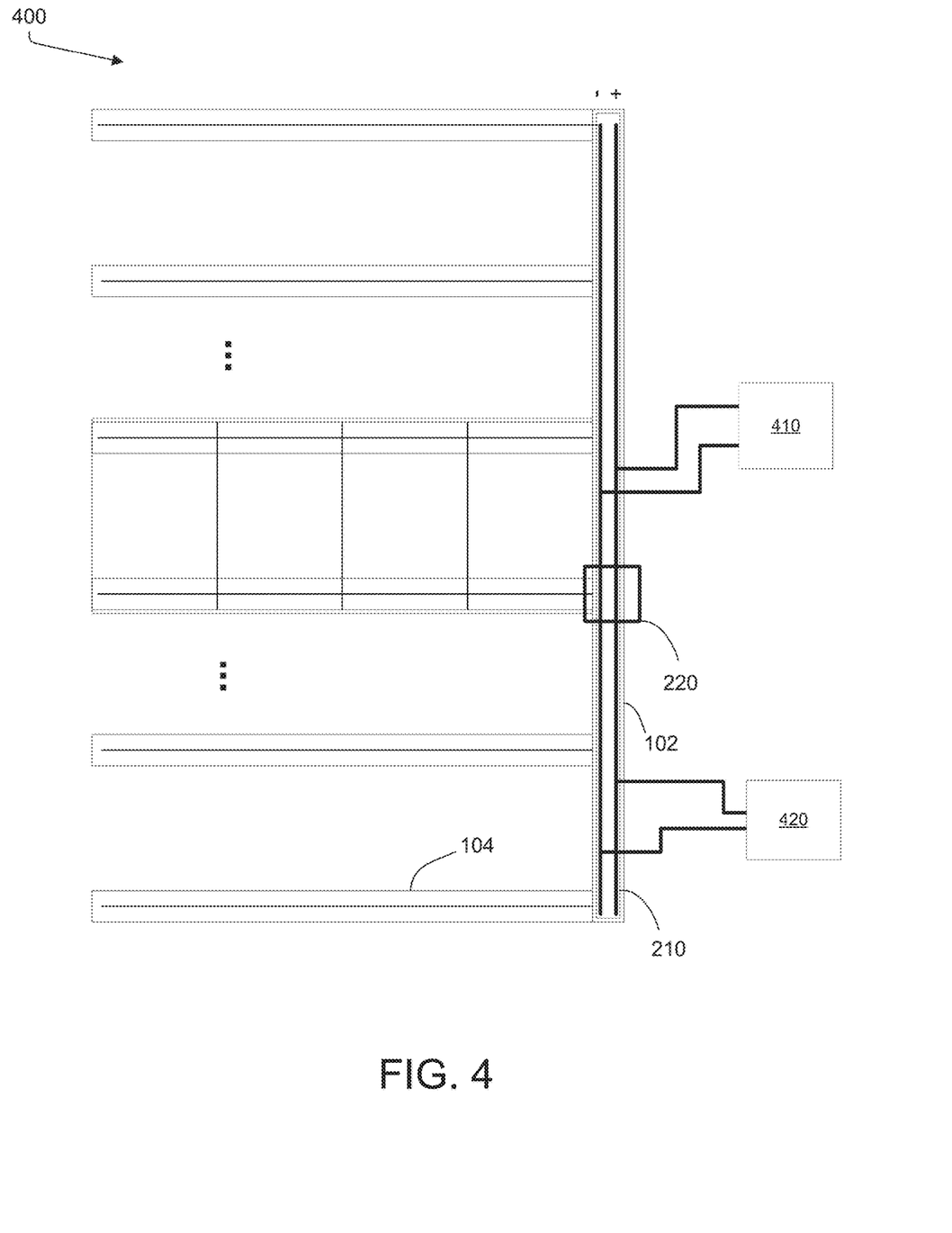
FIG. 4 illustrates another top view of an example integrated solar carport, according to some examples of the present disclosure.

FIG. 4 illustrates another top view 400 of an example integrated solar carport (e.g., integrated solar carport 100 as illustrated in FIG. 1). In the illustrative example of FIG. 4, integrated solar carport 100 includes an AC/DC rectifier 410, which is connected to busbar 210. In some examples, AC/DC rectifier 410 is configured to couple to a plurality of energy resources. Instead of having separate switchgear, AC connection, and inverter for a battery, for example, for EV charger 310, integrated solar carport 100 includes AC/DC rectifier 410 where all can be combined into a single site rectifier.

In some cases where on-site DERs do not provide sufficient energy for anticipated electric vehicle usage, a site-wide AC/DC rectifier 410 can be attached to integrated solar carport 100 (e.g., connected to busbar 210) and configured to couple to a plurality of energy resources. In some examples, the size of power electronics can be reduced in AC/DC rectifier 410. More specifically, AC/DC rectifier 410 can be undersized relative to the maximum simultaneous DC power draw from an EV charger (e.g., EV charger 310 as illustrated in FIG. 3) due to the presence of solar energy and/or an energy storage system (e.g., energy storage system 420 as illustrated in FIG. 4).

Furthermore, integrated solar carport 100 includes an energy storage system 420, which is connected to busbar 210. More specifically, the DC output can be tied to busbar 210. In some examples, energy storage system 420 can be integrated into the structure of integrated solar carport 100 with the DC output tied to HVDC busbar 210. In some examples, energy storage system 420 includes a cable(s) that can connect to an EV. An idle EV (e.g., an EV that is not actively charging but otherwise unavailable for use or simply parking underneath integrated solar carport 100 without charging) can serve the function of an energy resource. For example, an EV that is fitted with bi-directional charging capabilities can connect to the cable of energy storage system 420 and provide power, which can be stored at energy storage system 420.

Figure 5:
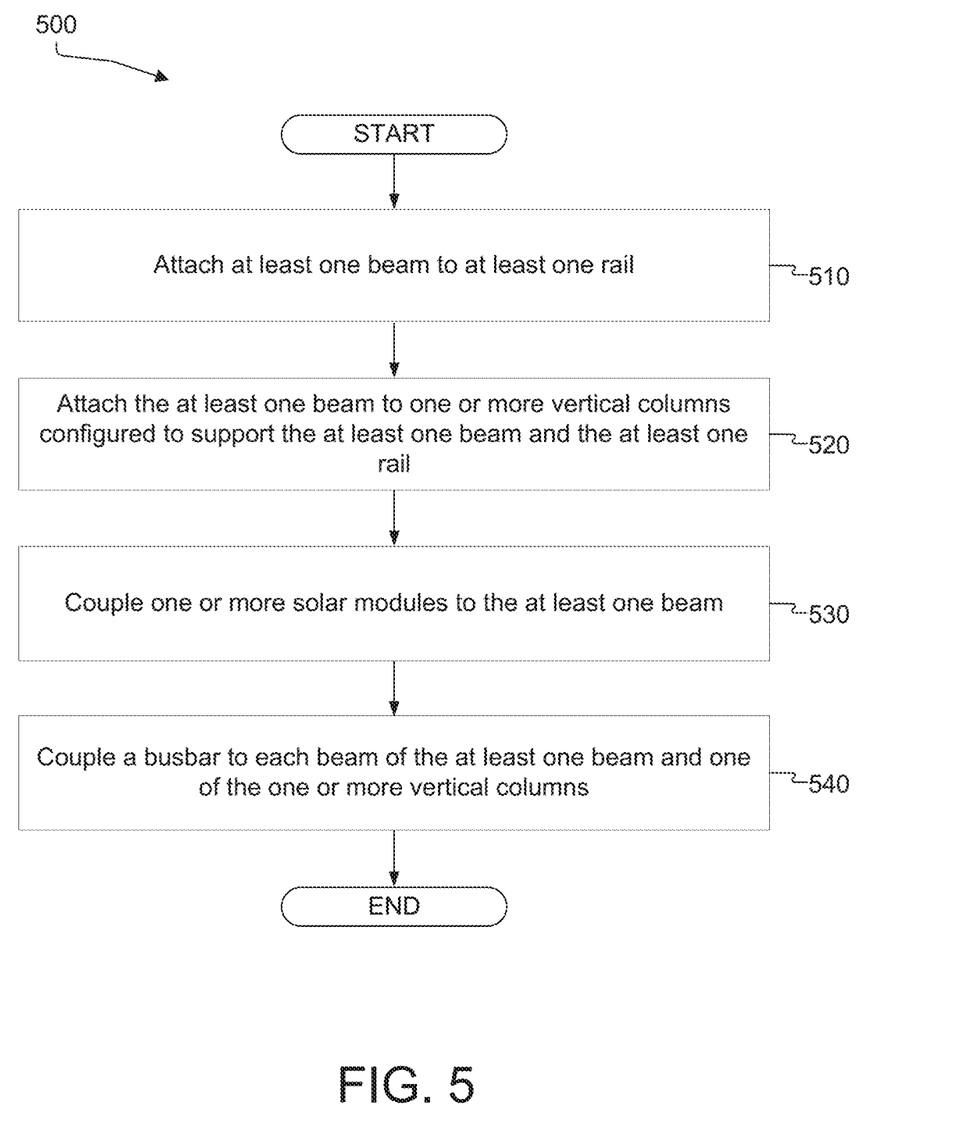
FIG. 5 illustrates an example method of assembling or manufacturing an integrated solar carport structure, according to some examples of the present disclosure.

FIG. 5 illustrates an example method 500 of assembling or manufacturing an integrated solar carport structure. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

At step 510, method 500 includes attaching at least one beam to at least one rail. For example, beam 102 as illustrated in FIG. 1 can be attached to rail 103.

At step 520, method 500 includes attaching the at least one beam to one or more vertical columns configured to support the at least one beam and the at least one rail. For example, beam 102 as illustrated in FIG. 1 can be attached to vertical column 108, which can support beam 102 and rail 104. The assembly of beam 102, rail 104, and vertical column 108 forms the skeleton of a carport structure.

At step 530, method 500 includes coupling one or more solar modules to the at least one beam. For example, a plurality of solar modules 106 as illustrated in FIG. 1 can be coupled to beam 102 and/or rail 104.

At step 540, method 500 includes coupling a busbar to each beam of the at least one beam and one of the one or more vertical columns. For example, busbar 210 as illustrated in FIG. 2 can be coupled to each beam 102 and one of vertical columns 108. Further, the solar modules can be connected to a busbar, for example, via an integrated MC4 connector. For example, solar modules 106 as illustrated in FIG. 1 can be coupled to a positive point of busbar 210 at rail 104 and a negative point of busbar 210 at beam 102.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. An integrated carport comprising: at least one beam; at least one rail coupled to the at least one beam; one or more vertical columns configured to support the at least one beam and the at least one rail; one or more solar modules, coupled to the at least one beam or the at least one rail; and a busbar coupled to each beam of the at least one beam and one of the one or more vertical columns.

Aspect 2. The integrated carport of Aspect 1, further comprising: a DC-DC converter partially coupled to one of the at least one beam and configured to convert a first voltage of the one or more solar modules to a second voltage of the busbar.

Aspect 3. The integrated carport of Aspect 2, wherein the DC-DC converter is removable.

Aspect 4. The integrated carport of Aspect 1, wherein the busbar is configured to distribute power at a fixed voltage.

Aspect 5. The integrated carport of Aspects 1 to 4, further comprising: an electronic vehicle (EV) charger coupled to one of the one or more vertical columns.

Aspect 6. The integrated carport of Aspects 1 to 5, further comprising: an energy storage system (ESS) connected to the busbar.

Aspect 7. The integrated carport of Aspect 6, wherein the energy storage system includes one or more cables to connect to an electronic vehicle (EV).

Aspect 8. The integrated carport of Aspects 1 to 7, further comprising: one or more electrical connectors coupled to the at least one beam and configured to electrically connect with the busbar.

Aspect 9. The integrated carport of Aspects 1 to 9, further comprising: an AC-DC rectifier configured to couple to a plurality of energy resources.

Aspect 10. The integrated carport of Aspect 9, wherein the AC-DC rectifier is connected to the plurality of energy resources including at least one of the EV charger via the busbar.

Aspect 11. The integrated carport of Aspects 1 to 10, wherein the one or more solar modules are wired to each other in series.

Aspect 12. The integrated carport of Aspects 1 to 11, wherein each of the one or more solar modules is coupled to a positive point of the busbar at the at least one rail and a negative point of the busbar at the at least one beam.

Aspect 13. The integrated carport of Aspects 1 to 12, wherein the busbar is enclosed within each of the at least one beam and the one of the one or more vertical columns.

Aspect 14. The integrated carport of Aspects 1 to 13, wherein the busbar is insulated.

Aspect 15. The integrated carport of Aspects 1 to 14, wherein the busbar is a high voltage direct current (HVDC) busbar.

Aspect 16. A method of manufacturing an integrated carport structure comprising: attaching at least one beam to at least one rail; attaching the at least one beam to one or more vertical columns configured to support the at least one beam and the at least one rail; coupling one or more solar modules to the at least one beam; and coupling a busbar to each beam of the at least one beam and one of the one or more vertical columns.

Aspect 17. The method of Aspect 16, further comprising: attaching a DC-DC converter to one of the at least on beam, wherein the DC-DC converter is configured to convert a first voltage of the one or more solar modules to a second voltage of the busbar.

Aspect 18. The method of Aspect 16, further comprising: coupling an electronic vehicle (EV) charger to one of the one or more vertical columns of the solar carport.

Aspect 19. The method of Aspect 16, further comprising: coupling an energy storage system (ESS) to the busbar.

Aspect 20. An integrated carport comprising: at least one beam; at least one rail coupled to the at least one beam; one or more vertical columns configured to support the at least one beam and the at least one rail; one or more electric panels coupled to the at least one beam or the at least one rail; a busbar enclosed within each beam of the at least one beam and one of the one or more vertical columns; and an energy storage system connected to the busbar, the energy storage system being configured to provide power to an autonomous vehicle (AV).

What is claimed is:

1. An integrated carport comprising:
   at least one beam;
   at least one rail coupled to the at least one beam;
   one or more vertical columns configured to support the at least one beam and the at least one rail;
   one or more solar modules coupled to the at least one beam or the at least one rail;
   a first busbar and a second bus bar, wherein each of the first busbar and the second busbar are coupled within each beam of the at least one beam and one of the one or more vertical columns, wherein each of the first and second busbars are insulated in a rubberized coating and a thermal insulation coating;
   a DC-DC converter partially coupled to one of the at least one beam and configured to convert a first voltage of the one or more solar modules to a second voltage of the busbar;
   a first set of MC4 connectors coupled to the first busbar and the second busbar, wherein the first set of MC4 connectors are attached to the at least one beam via an injection molding process and the first set of MC4 connectors couples the one or more solar modules to the first busbar and the second busbar; and
   a second set of MC4 connectors coupled to the first busbar and the second busbar, wherein the second set of MC4 connectors are attached to the at least one beam via the injection molding process and the second set of MC4 connectors couples the DC-DC converter to the first busbar and the second busbar;
   wherein the one or more solar modules are coupled to the first busbar and the second busbar via a first set of MC4 connectors, wherein the first set of MC4 connectors are attached to the at least one beam via an injection molding process and the first set of MC4, and
   wherein the one or more solar modules includes a first set of solar modules that are connected in a string to a first independent bus bar and the one or more solar modules includes a second set of solar modules that are connected in a string to a second independent bus bar, wherein the first independent bus bar and the second independent bus bar are connected to the first and second busbars.

2. The integrated carport of claim 1, wherein the DC-DC converter is removable.

3. The integrated carport of claim 1, wherein the first and second busbars is configured to distribute power at a fixed voltage.

4. The integrated carport of claim 1, further comprising: an electronic vehicle (EV) charger coupled to one of the one or more vertical columns.

5. The integrated carport of claim 1, further comprising: an energy storage system (ESS) connected to the first and second busbars.

6. The integrated carport of claim 5, wherein the energy storage system includes one or more cables to connect to an electronic vehicle (EV).

7. The integrated carport of claim 1, further comprising: an AC-DC rectifier configured to couple to a plurality of energy resources.

8. The integrated carport of claim 7, wherein the AC-DC rectifier is connected to the plurality of energy resources including at least one of the EV charger via the first and second busbars.

9. The integrated carport of claim 1, wherein each of the one or more solar modules is coupled to a positive point of the first and second busbars at the at least one rail and a negative point of the first and second busbars at the at least one beam.

10. The integrated carport of claim 1, wherein the first and second busbars are a high voltage direct current (HVDC) busbars.

11. A method of manufacturing an integrated carport structure comprising:
- attaching at least one beam to at least one rail;
- attaching the at least one beam to one or more vertical columns configured to support the at least one beam and the at least one rail;
- coupling one or more solar modules to the at least one beam;
- coupling a first busbar and a second bus bar within each beam of the at least one beam and one of the one or more vertical columns, wherein each of the first and second busbars are insulated in a rubberized coating and a thermal insulation coating;
- coupling a DC-DC converter to one of the at least one beam and configured to convert a first voltage of the one or more solar modules to a second voltage of the busbar;
- coupling a first set of MC4 connectors to the first busbar and the second busbar, wherein the first set of MC4 connectors are coupled to the at least one beam via an injection molding process and the first set of MC4 connectors couples the one or more solar modules to the first busbar and the second busbar; and
- coupling a second set of MC4 connectors coupled to the first busbar and the second busbar, wherein the second set of MC4 connectors are coupled to the at least one beam via the injection molding process and the second set of MC4 connectors couples the DC-DC converter to the first busbar and the second busbar;
- wherein the one or more solar modules are coupled to the first busbar and the second busbar via a first set of MC4 connectors, wherein the first set of MC4 connectors are attached to the at least one beam via an injection molding process and the first set of MC4, and
- wherein the one or more solar modules includes a first set of solar modules that are connected in a string to a first independent bus bar and the one or more solar modules includes a second set of solar modules that are connected in a string to a second independent bus bar, wherein the first independent bus bar and the second independent bus bar are connected to the first and second busbars.

12. The method of claim 11, further comprising:
coupling an electronic vehicle (EV) charger to one of the one or more vertical columns.

13. The method of claim 11, further comprising:
coupling an energy storage system (ESS) to the first and second busbars.

* * * * *